US010078392B2

(12) United States Patent
Huang et al.

(10) Patent No.: US 10,078,392 B2
(45) Date of Patent: Sep. 18, 2018

(54) LOW LOADING DRIVING METHOD, DRIVER INTEGRATED CIRCUIT APPLYING THE METHOD, AND TOUCH DISPLAY SYSTEM

(71) Applicant: HIMAX TECHNOLOGIES LIMITED, Tainan (TW)

(72) Inventors: Guan-Ying Huang, Tainan (TW); Yaw-Guang Chang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 225 days.

(21) Appl. No.: 14/829,636

(22) Filed: Aug. 18, 2015

(65) Prior Publication Data

US 2016/0299620 A1 Oct. 13, 2016

Related U.S. Application Data

(60) Provisional application No. 62/144,944, filed on Apr. 9, 2015.

(51) Int. Cl.
*G06F 3/041* (2006.01)
*G02F 1/1333* (2006.01)
(Continued)

(52) U.S. Cl.
CPC ........ *G06F 3/0416* (2013.01); *G02F 1/13338* (2013.01); *G06F 1/16* (2013.01);
(Continued)

(58) Field of Classification Search
CPC .... G02F 1/13338; G06F 3/044; G06F 3/0416; G06F 3/0412; G06F 1/16; G09G 3/3655; G09G 2354/00
See application file for complete search history.

(56) References Cited

U.S. PATENT DOCUMENTS

2013/0033439 A1  2/2013  Kim
2013/0342478 A1  12/2013 Bae
(Continued)

FOREIGN PATENT DOCUMENTS

CN   102707480 A   10/2012
CN   103425317 A   12/2013
(Continued)

OTHER PUBLICATIONS

Hiroshi Haga et al., 45.1: Touch Panel Embedded IPS-LCD with Parasitic Current Reduction Technique, S I D International Symposium. Digest of Technical Papers, vol. 41, No. 1, 2010, pp. 669-672, XP055218917.

*Primary Examiner* — Abbas Abdulselam
(74) *Attorney, Agent, or Firm* — Winston Hsu (57) ABSTRACT

A driver integrated circuit (IC) is arranged to selectively operate in a display mode and a touch-sensing mode when the driver IC is coupled to a touch display panel. When the driver IC operates in the display mode, the driver IC controls a plurality of common voltage lines of the touch display panel to have a common voltage. When the driver IC operates in the touch-sensing mode, the driver IC controls a first source line of the touch display panel which corresponds to a specific common voltage line, or controls a neighboring common voltage line of the specific common voltage line, to have a first signal pattern the same as the first signal pattern on the specific voltage line or to be floating, wherein the specific common voltage line is arranged to detect touch currently.

20 Claims, 9 Drawing Sheets

(51) Int. Cl.
*G06F 3/044* (2006.01)
*G09G 3/36* (2006.01)
*G06F 1/16* (2006.01)

(52) U.S. Cl.
CPC ............ *G06F 3/044* (2013.01); *G06F 3/0412* (2013.01); *G09G 3/3655* (2013.01); *G09G 2354/00* (2013.01)

(56) References Cited

U.S. PATENT DOCUMENTS

| | | |
|---|---|---|
| 2014/0192012 A1 | 7/2014 | Kurasawa |
| 2014/0285466 A1 | 9/2014 | Hayashi |
| 2015/0035766 A1 | 2/2015 | Chung |
| 2015/0049041 A1* | 2/2015 | Yousefpor ............ G06F 3/0412 345/174 |
| 2015/0321558 A1* | 11/2015 | Solomon ................ B60K 37/06 701/526 |
| 2016/0018916 A1* | 1/2016 | Lee ...................... G09G 3/3208 345/173 |
| 2016/0098114 A1* | 4/2016 | Pylvas .................. G06F 3/0412 345/174 |
| 2016/0162110 A1* | 6/2016 | Kim ........................ G06F 3/041 345/174 |

FOREIGN PATENT DOCUMENTS

| | | |
|---|---|---|
| CN | 104238805 A | 12/2014 |
| JP | 2012230657 A | 11/2012 |
| JP | 2014199605 A | 10/2014 |
| KR | 101331038 B1 | 11/2013 |
| TW | 201308170 A1 | 2/2013 |
| TW | 201430654 A | 8/2014 |

* cited by examiner

LOW LOADING DRIVING METHOD, DRIVER INTEGRATED CIRCUIT APPLYING THE METHOD, AND TOUCH DISPLAY SYSTEM

CROSS REFERENCE TO RELATED APPLICATIONS

This application claims the benefit of U.S. Provisional Application No. 62/144,944 filed on Apr. 9, 2015, the contents of which are incorporated herein by reference.

BACKGROUND OF THE INVENTION

1. Field of the Invention

The present invention relates to a driving method, and more particularly, to a low loading driving method, a driver integrated circuit (IC) applying the method and a touch display system applying the driver IC.

2. Description of the Prior Art

In the field of capacitive touch detection, electronic devices such as smart phones or tablets are becoming thinner and lighter, which has pushed the development of capacitive touch into on-cell or even in-cell techniques from Indium Tin Oxide (ITO) film. The load within a touch display panel in the in-cell technique is much greater than in ITO film, which may cause sensitivity degradation; furthermore, the detecting time for the touch driver IC in the in-cell technique is reduced when the resolution of the screen of an electronic device becomes higher. Therefore, implementing the in-cell technique in a high resolution panel is quite difficult.

SUMMARY OF THE INVENTION

One of the objectives of the present invention is to provide a low loading driving method, a driver IC applying the method and a touch display system applying the driver IC to solve the abovementioned problem.

According to an embodiment of the present invention, a driver IC is disclosed, wherein the driver IC is arranged to selectively operate in a display mode and a touch-sensing mode when the driver IC is coupled to a touch display panel, wherein when the driver IC operates in the display mode, the driver IC controls a plurality of common voltage lines of the touch display panel to have a common voltage; when the driver IC operates in the touch-sensing mode, the driver IC controls a first source line of the touch display panel which corresponds to a specific common voltage line, or controls a neighboring common voltage line of the specific common voltage line, to have a first signal pattern the same as the first signal pattern on the specific voltage line or to be floating, wherein the specific common voltage line is arranged to detect touch currently.

According to an embodiment of the present invention, a touch display system is disclosed, wherein the touch display system comprises a touch display panel and a driver IC. The touch display panel comprises a plurality of gate lines; a plurality of source lines, disposed above the gate lines, wherein the source lines and the gate lines are crisscrossed; and a plurality of common voltage lines, disposed above the source lines. The driver IC coupled to the touch display panel is arranged to selectively operate in a display mode and a touch-sensing mode when the driver IC is coupled to a touch display panel, wherein when the driver IC operates in the display mode, the driver IC controls a plurality of common voltage lines of the touch display panel to have a common voltage; when the driver IC operates in the touch-sensing mode, the driver IC controls a first source line of the touch display panel which corresponds to a specific common voltage line, or controls a neighboring common voltage line of the specific common voltage line, to have a first signal pattern the same as the first signal pattern on the specific voltage line or to be floating, wherein the specific common voltage line is arranged to detect touch currently.

According to an embodiment of the present invention, a driving method of a touch display panel is disclosed, wherein the method comprises: selectively operating in a display mode and a touch-sensing mode; when operating in the display mode, controlling a plurality of common voltage lines of the touch display panel to have a common voltage; when operating in the touch-sensing mode, controlling a first source line of the touch display panel which corresponds to a specific common voltage line, or controlling a neighboring common voltage line of the specific common voltage line, to have a first signal pattern the same as the first signal pattern on the specific voltage line or to be floating, wherein the specific common voltage line is arranged to detect touch currently.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1:
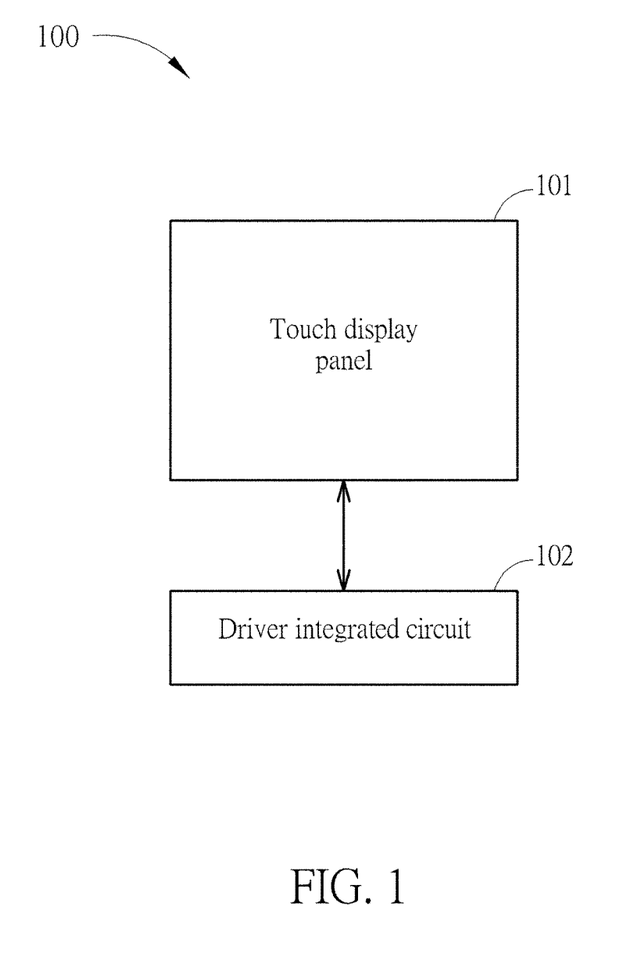
FIG. 1 is a diagram illustrating a touch display system according to an embodiment of the present invention.

FIG. 1 is a diagram illustrating a touch display system 100 according to an embodiment of the present invention. As shown in FIG. 1, the touch display system comprises a touch display panel 101 and a driver IC 102, wherein the touch display panel 101 can be applied in an electronic device such as a smart phone, a tablet, or any device comprising a touch display panel, and the driver IC 102 coupled to the touch display panel 101 can selectively operate in a display mode and a touch-sensing mode.

Figure 2:
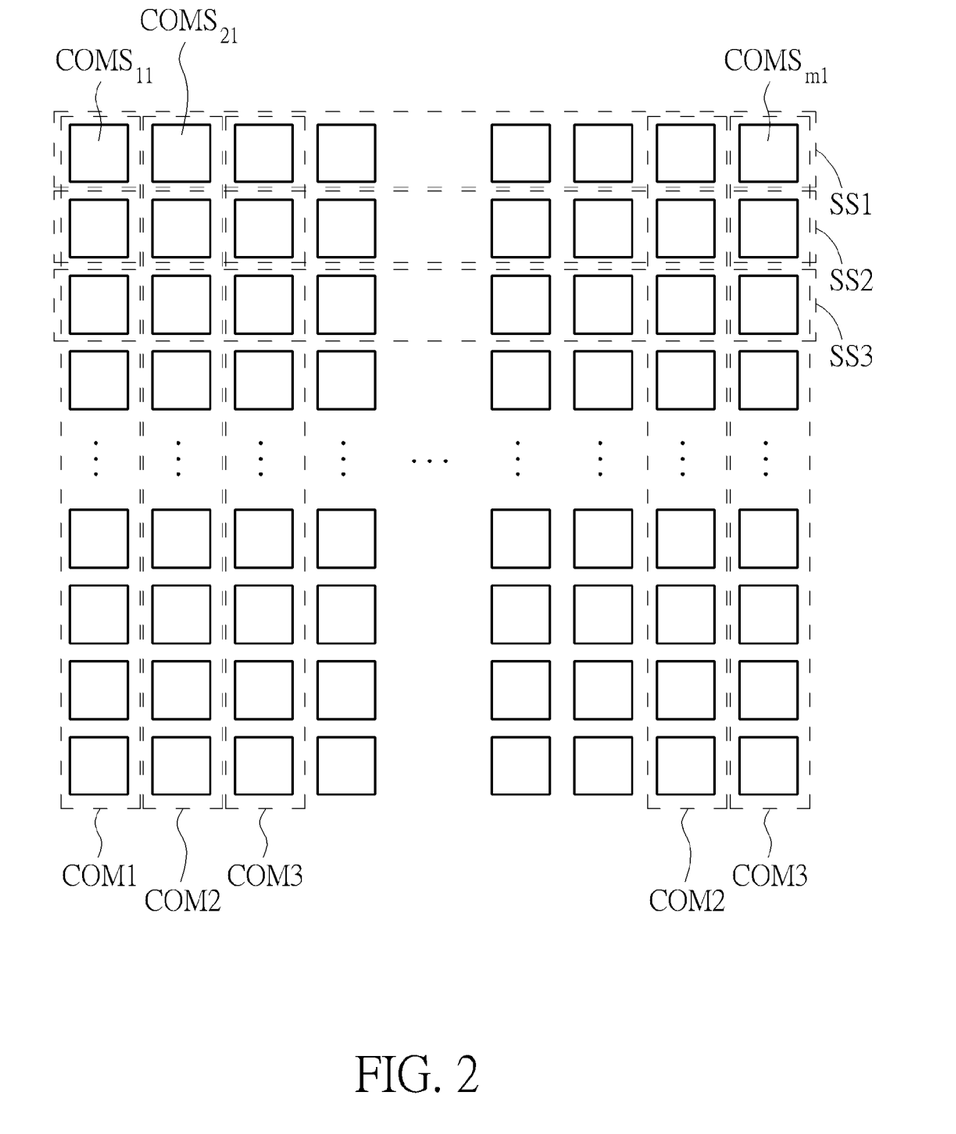
FIG. 2 is a diagram illustrating a common voltage layer of a display panel according to an embodiment of the present invention.
Figure 3:
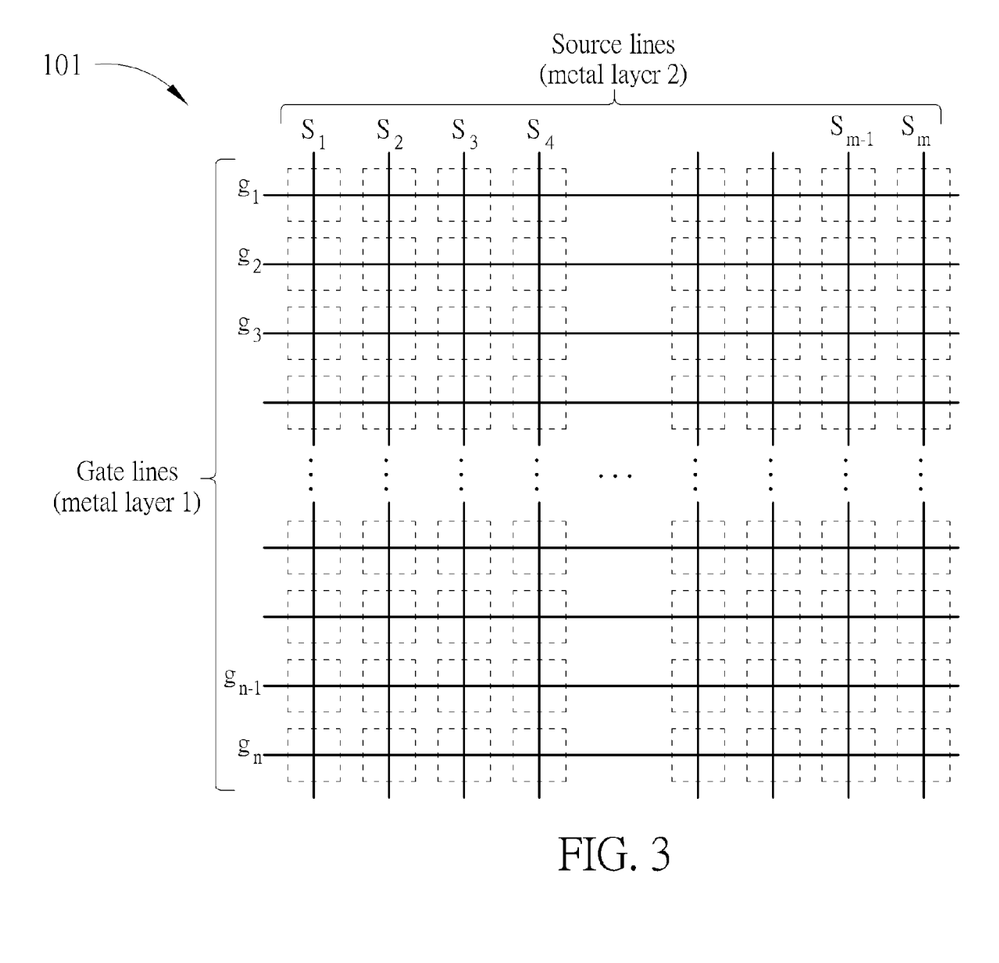
FIG. 3 is a diagram illustrating source lines and gate lines underneath the common voltage layer according to an embodiment of the present invention.

FIG. 2 and FIG. 3 illustrate the architecture of the touch display panel 101, wherein FIG. 2 illustrates a common voltage layer of the touch display panel 101 according to an embodiment of the present invention. As shown in FIG. 2, the common voltage layer is divided into a plurality of common voltage parts $COM_1$ to $COM_m$, and each of the plurality of common voltage parts comprises a plurality of common voltage sections, e.g. the common voltage section $COMS_{11}$, $COMS_{12}$, ..., $COMS_{1n}$ included in the common voltage part $COM_1$. In addition, the first common voltage sections of each common voltage part, e.g. $COMS_{11}$, $COMS_{21}$, ..., and $COMS_{m1}$, are connected together to constitute a signal section SS1. Likewise, the second common voltage sections of each common voltage part, e.g. $COMS_{12}$, $COMS_{22}$, ..., and $COMS_{m2}$, are connected together to constitute a signal section SS2, and so on. The plurality of signal sections and the plurality of common voltage parts are coupled to the driver IC 102.

As shown in FIG. 3, the touch display panel further comprises a second metal layer and a first metal layer, wherein the second metal layer underneath the common voltage layer comprises a plurality of source lines $S_1$ to $S_m$, where each source line substantially corresponds to one of the plurality of common voltage parts. The first metal layer is underneath the second metal layer and comprises a plurality of gate lines $g_1$ to $g_j$, wherein the plurality of source lines S1 to Sm and the plurality of gate lines g1-gn are crisscrossed as shown in FIG. 3. Moreover, the plurality of source lines S1 to Sm and the plurality of gate lines g1-gn are both coupled to the driver IC 102.

Figure 4:
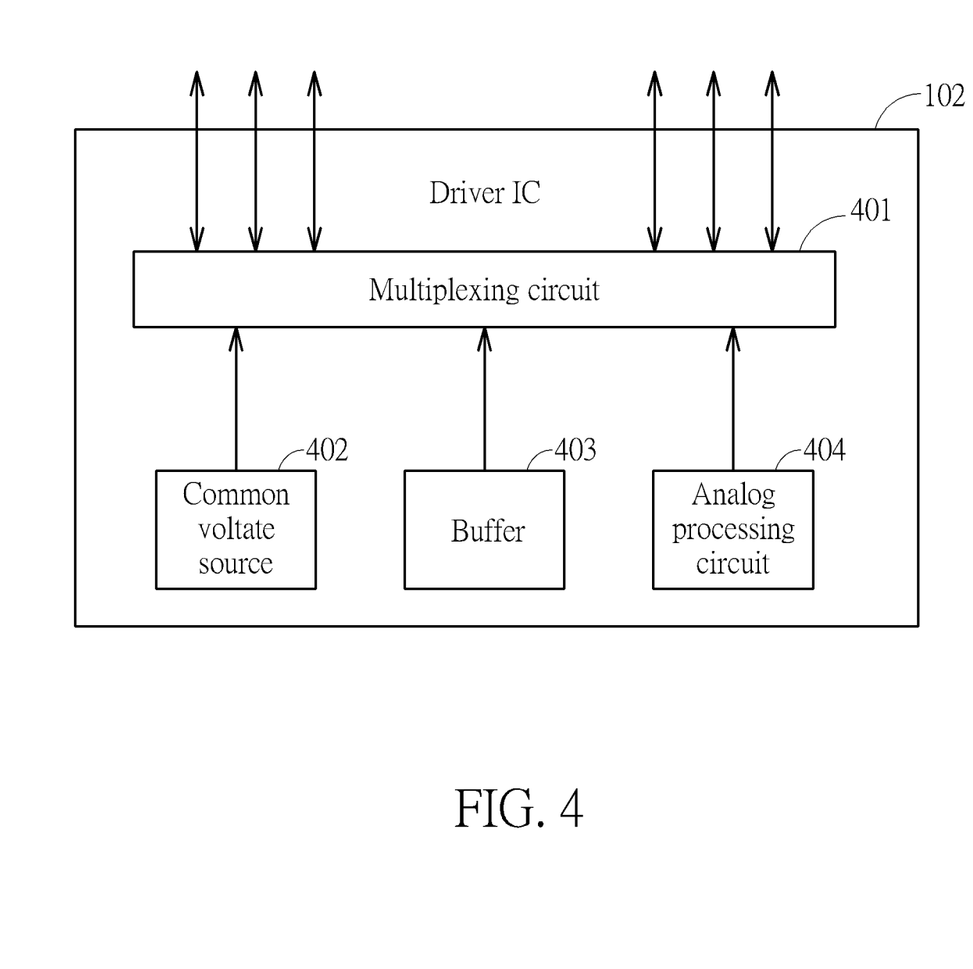
FIG. 4 is a diagram illustrating a driver IC applied to the touch display system according to an embodiment of the present invention.

FIG. 4 is a diagram illustrating the driver IC 102 applied to the touch display system 100 according to an embodiment of the present invention, wherein the driver IC 102 comprises a multiplexing circuit 401, a common voltage source 402, a buffer 403 and an analog processing circuit 404. The common voltage source 402 is arranged for providing a common voltage to the common voltage layer, i.e. to the plurality of common voltage parts, the buffer 403 is arranged for storing display data, and the analog processing circuit 404 comprising an analog front end and a plurality of analog-to-digital converters is arranged for processing the signals received from the plurality of signal sections. The multiplexing circuit 401 is coupled to the common voltage source 402, the buffer 303 and the analog processing circuit 404, and is arranged for controlling the signals outputted to or received from the plurality of common voltage parts, the plurality of gate lines and the plurality of source lines.

When the driver IC 102 operates in the display mode, the driver IC 102 transmits the display data stored in the buffer 403 to the plurality of source lines, and controls the plurality of common voltage parts to have a predetermined voltage. When the driver IC 102 operates in the touch-sensing mode, the driver IC 102 produces signals on one or more common voltage parts for sensing the touch, wherein the signals on the one or more common voltage parts for sensing the touch are not limited to be the same signal with the same frequency or the same phase. For example, if the driver IC 102 uses the common voltage parts $COM_1$, $COM_2$ and $COM_5$ for sensing the touch, the driver IC 102 (more specifically, the analog processing circuit 404) may produce three signals with three different phases or different frequencies on the common voltage parts $COM_1$, $COM_2$ and $COM_5$. This sensing mechanism should be well known to persons skilled in the art. The inventive concept of the disclosure focuses on the method for lowering the loading in the touch-sensing mode. Therefore, details of the sensing mechanism for the touch display system are omitted here.

Figure 5:
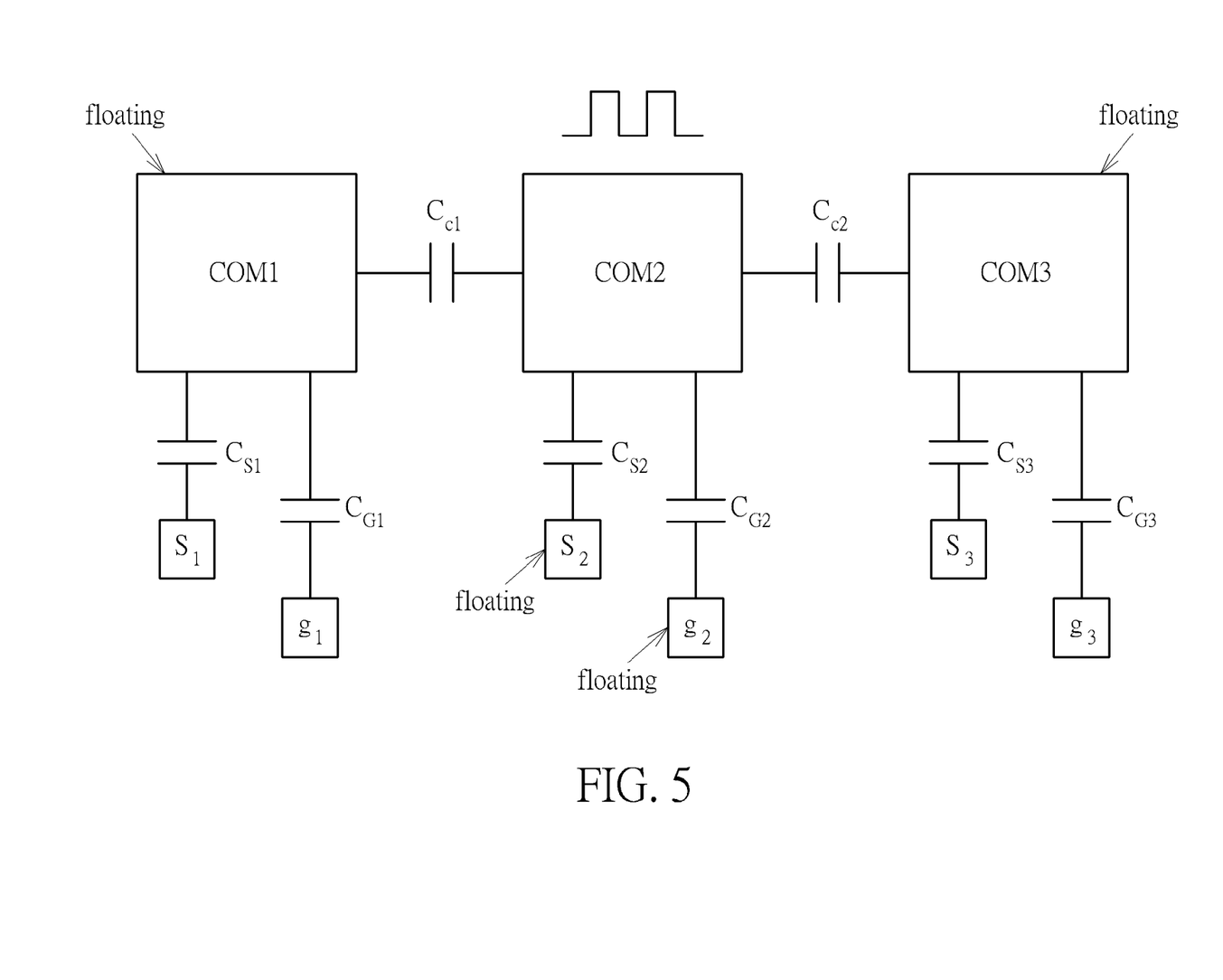
FIG. 5 is a diagram illustrating a low loading sensing method according to an embodiment of the present invention.

To solve the loading issue mentioned in the prior art, several embodiments for operating in the touch-sensing mode are disclosed. FIG. 5 is a diagram illustrating a low loading sensing method according to an embodiment of the present invention. As shown in FIG. 5, the common voltage part $COM_2$ is used to sense the touch when the driver IC 102 operates in the touch-sensing mode. To lower the capacitor seen from the common voltage part $COM_2$, the driver IC controls the neighboring common voltage parts, i.e. the common voltage parts $COM_1$ and $COM_3$, and the corresponding source line and gate line, i.e. the source line S2 and the gate line g2, to be floating. In this way, the capacitors $C_{c1}$, $C_{c2}$, $C_{S2}$ and $C_{G2}$ no longer exist, and the sensitivity degradation is thus prevented.

Figure 6:
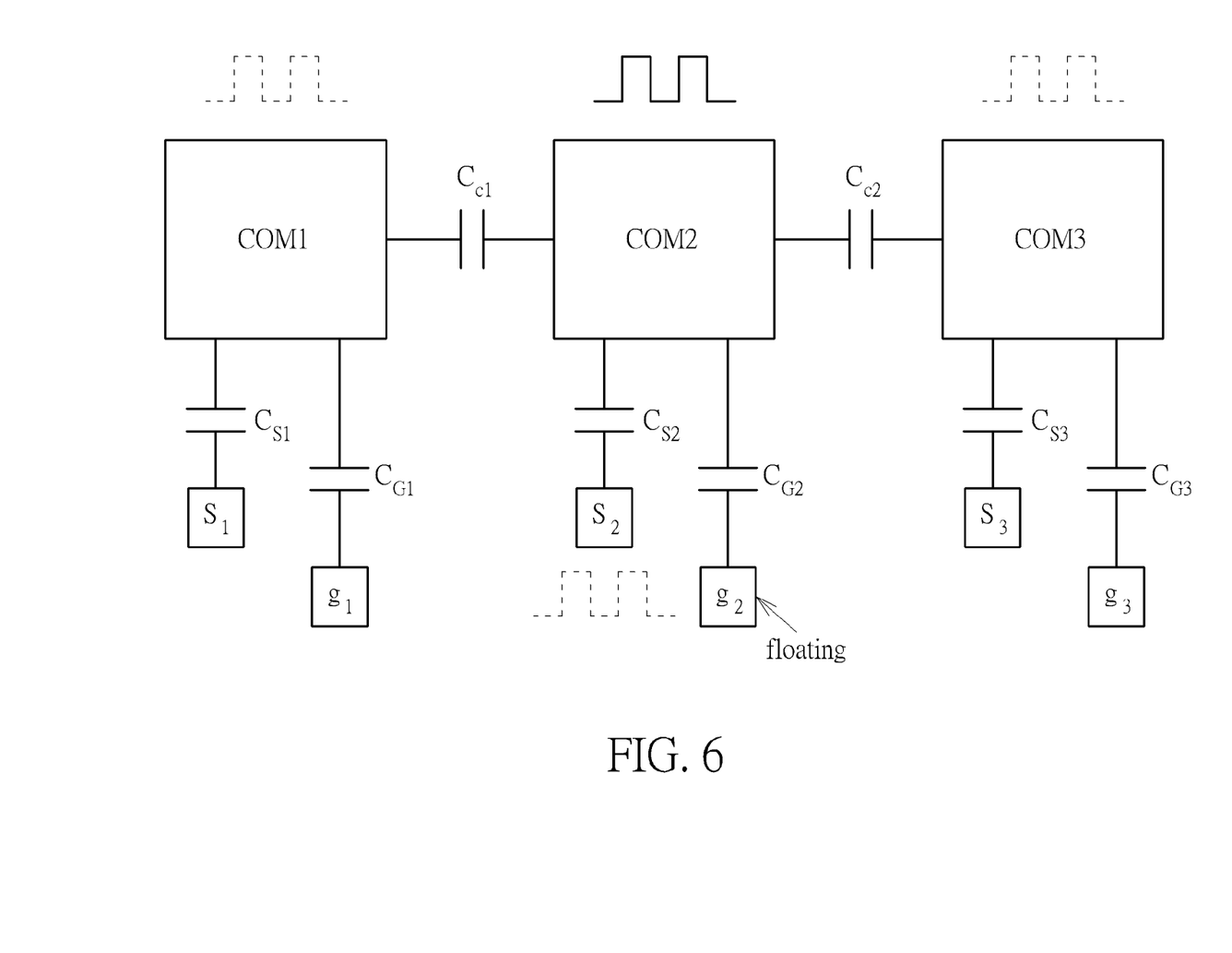
FIG. 6 is a diagram illustrating a low loading sensing method according to another embodiment of the present invention.

FIG. 6 is a diagram illustrating a low loading sensing method according to another embodiment of the present invention. As shown in FIG. 6, the common voltage part $COM_2$ is used to sense the touch when the driver IC 102 operates in the touch-sensing mode. To lower the capacitor seen from the common voltage part $COM_2$, the driver IC 102 controls the neighboring common voltage parts, i.e. the common voltage parts $COM_1$ and $COM_3$, and the corresponding source line, i.e. the source line S2, to have a signal pattern the same as the signal on the common voltage part $COM_2$. The driver IC 102 also controls the corresponding gate lines to be floating. In this way, the capacitors $C_{c1}$, $C_{c2}$, $C_{S2}$ and $C_{G2}$ no longer exist, and the sensitivity degradation is thus prevented.

Figure 7:
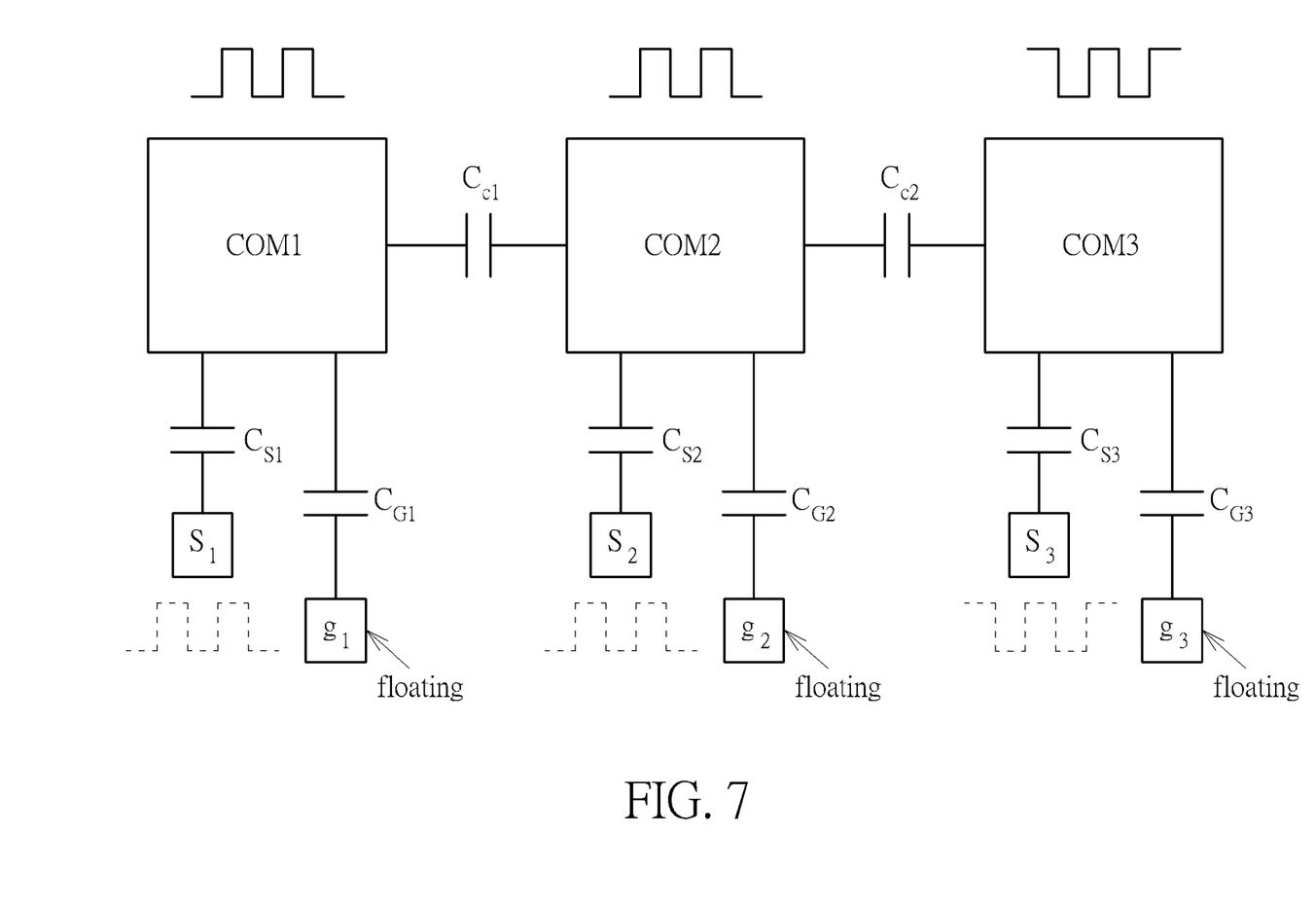
FIG. 7 is a diagram illustrating a low loading sensing method according to yet another embodiment of the present invention.

FIG. 7 is a diagram illustrating a low loading sensing method according to yet another embodiment of the present invention. In this embodiment, the common voltage parts $COM_1$, $COM_2$ and $COM_3$ are used to sense the touch when the driver IC 102 operates in the touch-sensing mode, wherein a signal on the common voltage part $COM_3$ for sensing the touch is different from signals on common voltage parts $COM_1$ and $COM_2$. The difference maybe the frequency between signals or the phase between signals which is not limited. As shown in FIG. 7, when the signals on the common voltage parts $COM_1$ and $COM_2$ for sensing the touch have a first signal pattern and the signal on the common voltage part $COM_3$ for sensing the touch have a second signal pattern, the driver IC controls the source line to have a signal with the same pattern as the signal on the corresponding common voltage part. For example, each of the source lines $S_1$ and $S_2$ has a signal with the first signal pattern as the signals on the common voltage parts $COM_1$ and $COM_2$. The source line $S_3$ has a signal with the second signal pattern as the signal on the common voltage part $COM_3$. The driver IC also controls the corresponding gate lines g1-g3 to be floating. In this way, the capacitor between the common voltage part and the corresponding source line no longer exists.

It should be noted that the embodiments mentioned above for lowering the capacitor seen from the common voltage part are only for illustrative purposes. The method should not be limited to those mentioned in the embodiments. For example, the driver IC 102 may control the neighboring common voltage parts to be floating and control the corresponding source line to have a signal with the same pattern as the signal on the specific common voltage part which is for sensing the touch. In another example, the driver IC 102 may control at least one of the neighboring common voltage parts to be floating and control the rest to have a signal with the same pattern as the signal on the specific common voltage part which is for sensing the touch. The person skilled in the art should understand these alternative embodiments after reading the paragraphs described above. As long as the driver IC controls signals on the common voltage parts and the corresponding source lines to reduce the capacitor seen from the specific common voltage parts for sensing the touch, these alternative embodiments should fall within the scope of the present invention.

Figure 8:
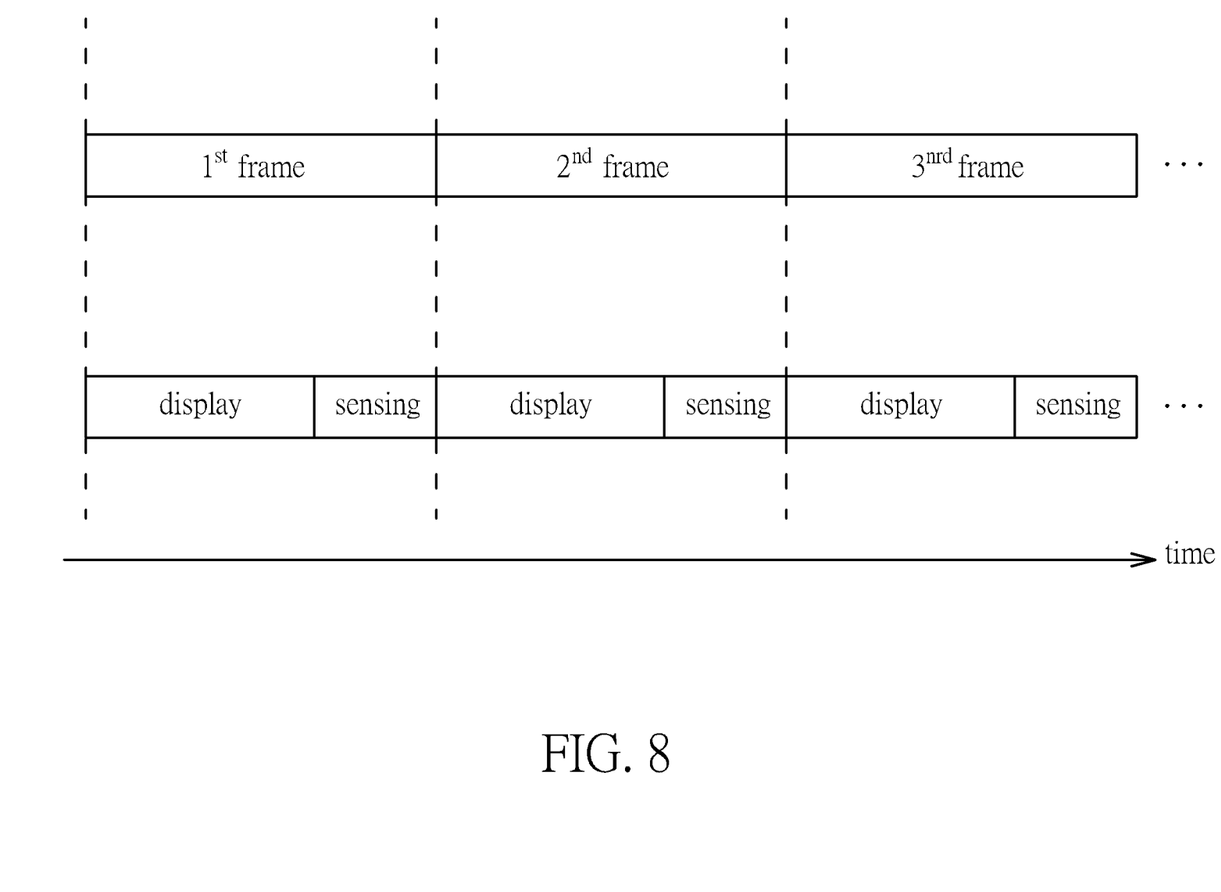
FIG. 8 is a timing diagram illustrating the timing arrangement for a display mode and a touch-sensing mode according to an embodiment of the present invention.

FIG. 8 is a timing diagram illustrating the timing arrangement for a display mode and a touch-sensing mode according to an embodiment of the present invention. As shown in FIG. 8, in each frame, the display mode occupies a portion of a time period and the touch-sensing mode occupies the rest of the time period. In this embodiment, in each frame, the display mode occupies 66% of the period of the first frame and the touch-sensing mode occupies 34% of the period. The lengths of the display mode and the touch-sensing mode here are only for illustrative purposes, and are not a limitation of the present invention. Any suitable length which can achieve the best performance falls within the scope of the present invention.

Figure 9:
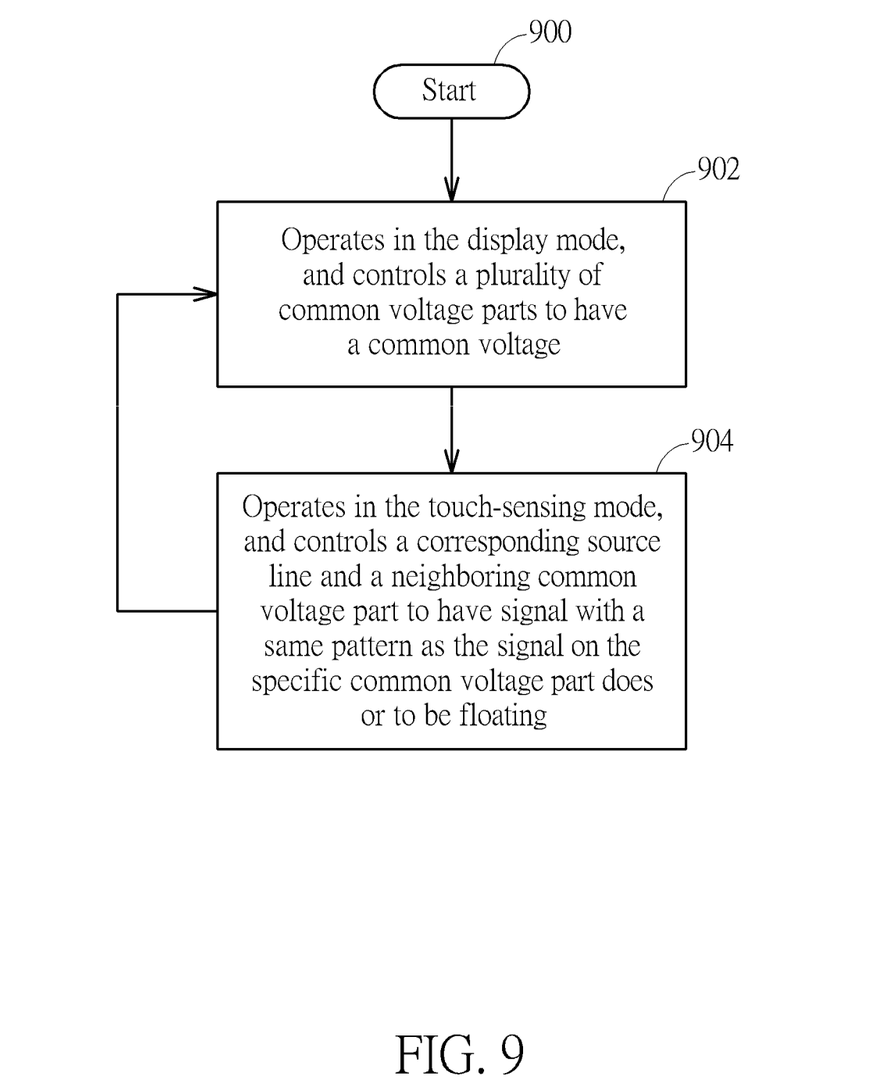
FIG. 9 is a flowchart illustrating the method of lowering the loading according to an embodiment of the present invention.

FIG. 9 is a flowchart illustrating the method of lowering the loading according to an embodiment of the present invention, wherein if the result is substantially the same, the steps are not required to be executed in the exact order shown in FIG. 9. The flow can be described as follows:

Step 900: Start.

Step 902: The driver IC operates in the display mode, and controls the plurality of common voltage parts to have a common voltage, and outputs display data to a plurality of source lines underneath the common voltage parts; the flow goes to step 904.

Step 904: The driver IC operates in the touch-sensing mode, and controls a corresponding source line and a neighboring common voltage part to have signals with a same pattern as the signal on the specific common voltage part for sensing the touch, or to be floating; the flow goes back to step 902.

Briefly summarized, the present invention discloses a method for lowering loading seen from a specific common voltage part for sensing a touch by controlling signals on a neighboring common voltage part and corresponding source line to have a same pattern as a signal on the specific common voltage line, or to be floating.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A driver integrated circuit (IC), arranged to selectively operate in a display mode and a touch-sensing mode when the driver IC is coupled to a touch display panel, wherein when the driver IC operates in the display mode, the driver IC controls a plurality of common voltage lines of the touch display panel to have a common voltage; when the driver IC operates in the touch-sensing mode, the driver IC controls a neighboring common voltage line of a specific common voltage line to have a first signal pattern the same as the first signal pattern on the specific common voltage line or to be floating, wherein the specific common voltage line is arranged to detect touch currently; wherein the touch display panel comprise a common voltage layer comprising the plurality of common voltage lines, and a metal layer underneath the common voltage layer comprising a plurality of source lines, and each of the plurality of source lines corresponds to one of the plurality of common voltage lines.

2. The driver IC of claim 1, wherein when the driver IC operates in the touch-sensing mode, the driver IC further controls a source line of the touch display panel which corresponds to the specific common voltage line, and controls the neighboring common voltage line of the specific common voltage line, to have the first signal pattern the same as the first signal pattern on the specific common voltage line.

3. The driver IC of claim 1, wherein when the driver IC operates in the touch-sensing mode, the driver IC further controls a source line of the touch display panel which corresponds to the specific common voltage line, and controls the neighboring common voltage line of the specific common voltage line, to be floating.

4. The driver IC of claim 1, wherein when the driver IC operates in the touch-sensing mode, the driver IC controls gate lines of the touch panel which corresponds to the specific common voltage line to be floating.

5. The driver IC of claim 1, wherein when the driver IC operates in the touch-sensing mode, the driver IC further controls a first source line of the touch display panel which corresponds to the specific common voltage line to have the first signal pattern the same as the first signal pattern on the specific common voltage line, and controls a second source line which corresponds to another neighboring common voltage line of the specific common voltage line, to have a second signal pattern the same as the second signal pattern on the other neighboring common voltage line or to be floating, wherein the second signal pattern is different from the first signal pattern; and the specific common voltage line and the other neighboring common voltage line are arranged to detect touch currently.

6. The driver IC of claim 1, comprising:
   a common voltage source, arranged to provide the common voltage;
   a buffer, for storing a display data; and
   a multiplexing circuit, coupled to the common voltage source and the buffer, for outputting the display data to the plurality of source lines and outputting the common voltage to the plurality of common voltage lines when the driver IC operates in the display mode; and controlling a source line corresponds to the specific common voltage line and the common voltage line to have the first signal pattern or to be floating.

7. The driver IC of claim 1, wherein when the driver IC operates in the touch-sensing mode, the driver IC controls a source line of the touch display panel which corresponds to the specific common voltage line to have the first signal pattern the same as the first signal pattern on the specific voltage line or to be floating.

8. A touch display system, comprising:
   a touch display panel, comprising:
      a plurality of gate lines;

a metal layer comprising a plurality of source lines, wherein the source lines are disposed above the gate lines, and the source lines and the gate lines are crisscrossed; and a common voltage layer comprising a plurality of common voltage lines, wherein the common voltage is disposed above the metal layer, and each of the plurality of source lines corresponds to one of the plurality of common voltage lines; and a driver integrated circuit (IC), coupled to the touch display panel, where the driver IC is arranged to selectively operate in a display mode and a touch-sensing mode when the driver IC is coupled to a touch display panel, wherein when the driver IC operates in the display mode, the driver IC controls a plurality of common voltage lines of the touch display panel to have a common voltage; when the driver IC operates in the touch-sensing mode, the driver IC controls a neighboring common voltage line of a specific common voltage line to have a first signal pattern the same as the first signal pattern on the specific common voltage line or to be floating, wherein the specific common voltage line is arranged to detect touch currently.

9. The touch display system of claim 8, wherein when the driver IC operates in the touch-sensing mode, the driver IC further controls a source line of the touch display panel which corresponds to the specific common voltage line, and controls the neighboring common voltage line of the specific common voltage line, to have the first signal pattern the same as the first signal pattern on the specific common voltage line.

10. The touch display system of claim 8, wherein when the driver IC operates in the touch-sensing mode, the driver IC further controls a source line of the touch display panel which corresponds to the specific common voltage line, and controls the neighboring common voltage line of the specific common voltage line, to be floating.

11. The touch display system of claim 8, wherein when the driver IC operates in the touch-sensing mode, the driver IC controls gate lines of the touch panel which corresponds to the specific common voltage line to be floating.

12. The touch display system of claim 8, wherein when the driver IC operates in the touch-sensing mode, the driver IC further controls a first source line of the touch display panel which corresponds to the specific common voltage line to have the first signal pattern the same as the first signal pattern on the specific common voltage line, and controls a second source line which corresponds to another neighboring common voltage line of the specific common voltage line, to have a second signal pattern the same as the second signal pattern on the other neighboring common voltage line or to be floating, wherein the second signal pattern is different from the first signal pattern; and the specific common voltage line and the other neighboring common voltage line are arranged to detect touch currently.

13. The touch display system of claim 8, comprising:
a common voltage source, arranged to provide the common voltage;
a buffer, for storing display data; and
a multiplexing circuit, coupled to the common voltage source and the buffer, for outputting the display data to the plurality of source lines and outputting the common voltage to the plurality of common voltage lines when the driver IC operates in the display mode; and controlling a source line which corresponds to the specific common voltage line and the common voltage line to have the first signal pattern or to be floating.

14. The touch display system of claim 8, wherein when the driver IC operates in the touch-sensing mode, the driver IC controls a source line of the touch display panel which corresponds to the specific common voltage line to have the first signal pattern the same as the first signal pattern on the specific voltage line or to be floating.

15. A driving method of a touch display panel, comprising:
selectively operating in a display mode and a touch-sensing mode;
when operating in the display mode, controlling a plurality of common voltage lines of the touch display panel to have a common voltage;
when operating in the touch-sensing mode, controlling a neighboring common voltage line of the specific common voltage line to have a first signal pattern the same as the first signal pattern on the specific common voltage line or to be floating, wherein the specific common voltage line is arranged to detect touch currently;
wherein the plurality of common voltage lines are comprised in a common voltage layer of the touch display panel, and the touch display panel further comprises a metal layer underneath the common voltage layer comprising a plurality of source lines, and each of the plurality of source lines corresponds to one of the plurality of common voltage lines.

16. The driving method of claim 15, further comprising:
when operating in the touch-sensing mode, further controlling a source line of the touch display panel which corresponds to the specific common voltage line, and controlling the neighboring common voltage line of the specific common voltage line, to have the first signal pattern the same as the first signal pattern on the specific common voltage line.

17. The driving method of claim 15, further comprising:
when operating in the touch-sensing mode, further controlling a source line of the touch display panel which corresponds to the specific common voltage line, and controlling the neighboring common voltage line of the specific common voltage line, to be floating.

18. The driving method of claim 15, further comprising:
when operating in the touch-sensing mode, controlling gate lines of the touch panel which corresponds to the specific common voltage line to be floating.

19. The driving method of claim 15, further comprising:
when operating in the touch-sensing mode, further controlling a first source line of the touch display panel which corresponds to the specific common voltage line to have the first signal pattern the same as the first signal pattern on the specific common voltage line, and controlling a second source line which corresponds to another neighboring common voltage line of the specific common voltage line, to have a second signal pattern the same as the second signal pattern on the other neighboring common voltage line or to be floating, wherein the second signal pattern is different from the first signal pattern; and
the specific common voltage line and the other neighboring common voltage line are arranged to detect touch currently.

20. The driving method of claim 15, further comprising:
when operating in the touch-sensing mode, controlling a source line of the touch display panel which corresponds to the specific common voltage line to have the first signal pattern the same as the first signal pattern on the specific voltage line or to be floating.

* * * * *